No. 789,146. PATENTED MAY 9, 1905.
L. DION.
APPARATUS FOR ELECTROLYZING LIQUIDS.
APPLICATION FILED JUNE 10, 1904.
2 SHEETS—SHEET 2.
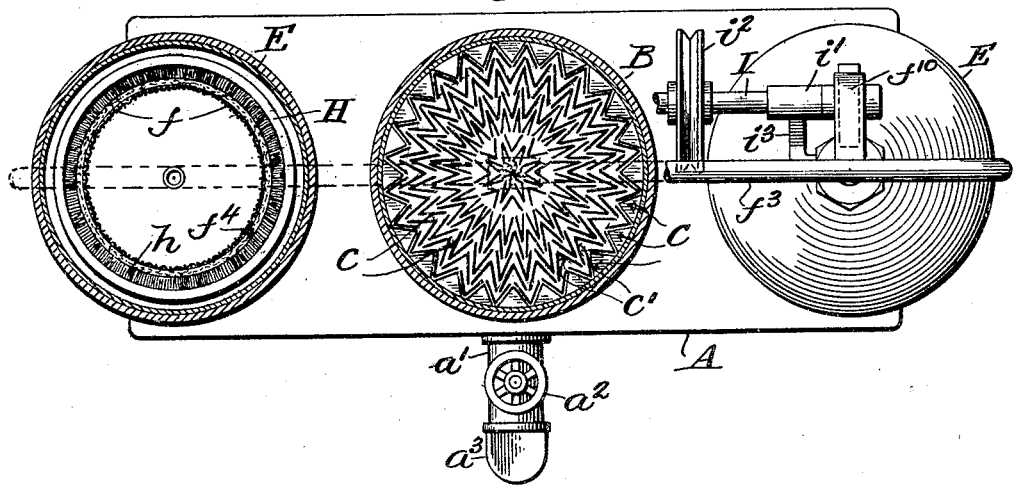
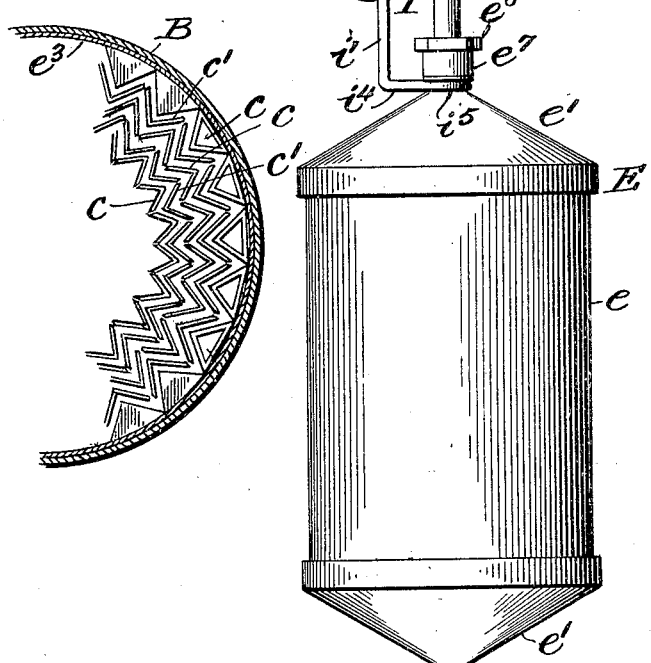
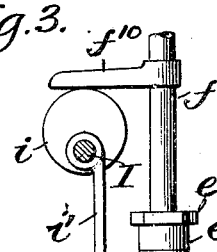
Witnesses
James F. Duhamel
Max B. A. Doring
Léon Dion,
Inventor,
By his Attorney Wm H. Appleton.

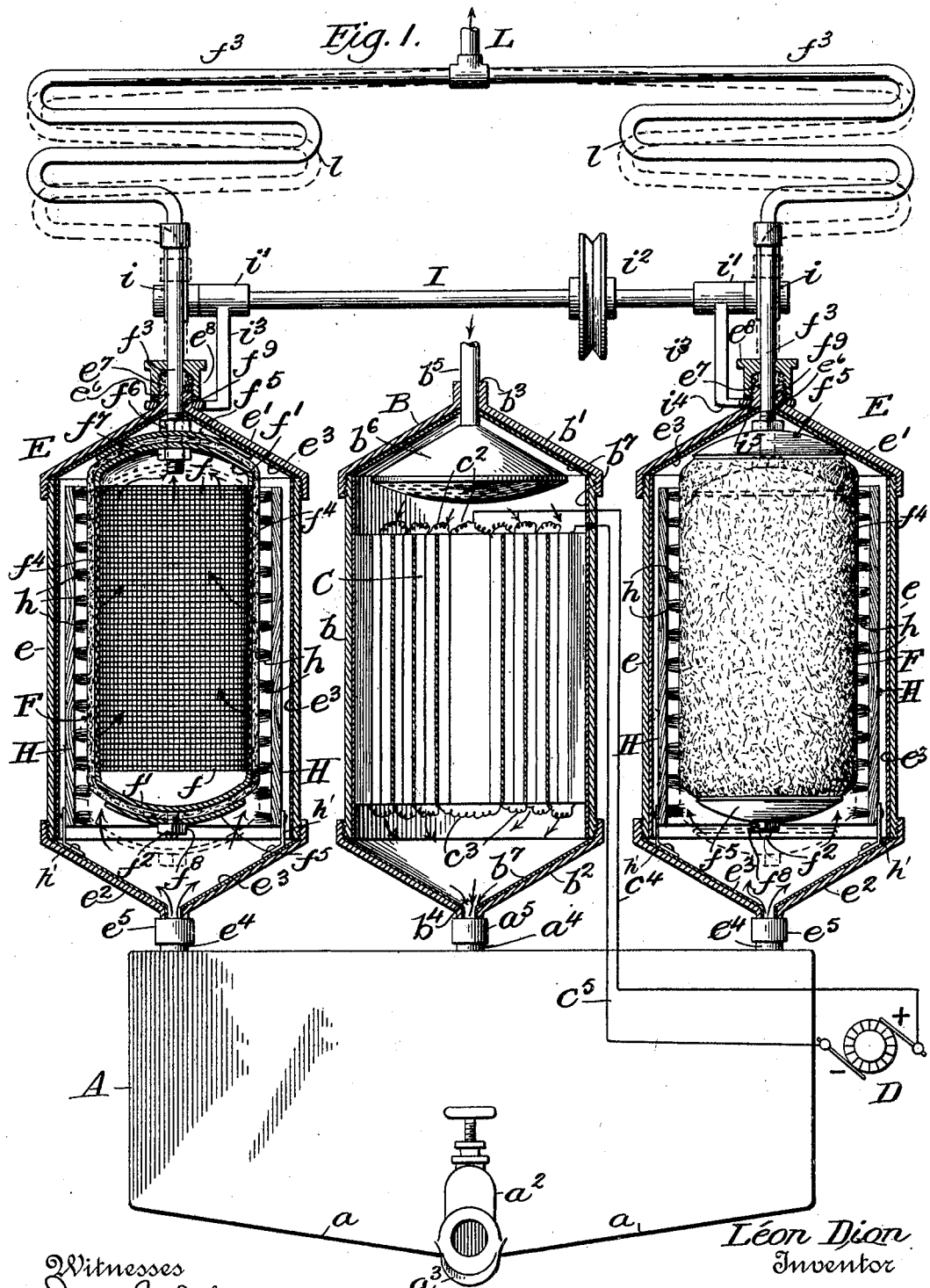

No. 789,146. Patented May 9, 1905

UNITED STATES PATENT OFFICE.

LÉON DION, OF NEW YORK, N. Y., ASSIGNOR TO THE AMERICUS ELECTRO-HERMETIC COMPANY, OF NEW YORK, N. Y., A CORPORATION OF ARIZONA TERRITORY.

APPARATUS FOR ELECTROLYZING LIQUIDS.

SPECIFICATION forming part of Letters Patent No. 789,146, dated May 9, 1905.

Application filed June 10, 1904. Serial No. 212,040.

*To all whom it may concern:*

Be it known that I, LÉON DION, a citizen of the United States, and a resident of the borough of Manhattan, in the city, county, and State of New York, have invented certain new and useful improvements in apparatus for use in the recovery of metals and other substances from liquids and in the purification of the liquids themselves, of which the following is a specification.

My invention, while capable of general application in the treatment of liquids to recover or remove the solids and other substances with which they may be combined, is especially useful in the treatment of waters from mines and mineral springs whereby to recover the metals and other substances contained in them and at the same time to purify the waters themselves, its object being to provide an apparatus for this purpose which, while simple in construction and efficient in operation, shall at the same time be practically automatic in action and require the minimum amount of attention when in use.

To these ends the invention consists in various peculiarities of construction and combinations of parts, all as will hereinafter more fully appear.

Referring to the accompanying drawings, which form a part of this specification, Figure 1 is a side elevation of an apparatus constructed in accordance with one form of my invention, the electrode and filtering chambers being shown in vertical section; Fig. 2, a plan view thereof, the electrode and one of the filtering-chambers being shown in horizontal section; Fig. 3, a side elevation of one of the filtering-chambers, showing also the means by which the vertical reciprocation of the inclosed filter is effected; and Fig. 4, a detail horizontal sectional view of a portion of the electrode-chamber and of the electrodes arranged therein.

In all the figures like letters of reference are employed to designate corresponding parts.

A indicates a tank or reservoir, which is or may be constructed in any approved form and of any convenient dimensions. In the drawings, however, I have shown it as constructed in the form of an elongated box, with the bottom $a$ thereof inclined downwardly from its end walls to its transverse median line and as provided on one of its sides with means whereby its contents may be discharged when desired. The means by which this discharge may be effected may be of any preferred form; but as here shown it consists of an outlet-pipe $a'$, which is located near the bottom of the tank and provided with a suitable valve $a^2$, by which the passage-way through it may be opened and closed, and is equipped on the under portion of its outer end with a suitable lip $a^3$, whereby to aid in guiding the contents of the tank into any required receptacle when being discharged.

B indicates a chamber in which the separation and concentration of the metal or other substances from the liquid undergoing treatment is effected. This chamber is preferably constructed with a cylindrical body portion $b$, with conical heads $b'$ and $b^2$ respectively threaded upon its upper and lower end, and is respectively provided in the apexes of these conical heads with apertures $b^3$ and $b^4$. As thus constructed this chamber is supported upon the tank A through the intervention of a nipple $a^4$ and coupling $a^5$ and receives through the apertures $b^3$ in its upper end a pipe $b^5$, which leads from the source of the liquid-supply, and is provided at its lower end within the chamber with an enlarged perforated nozzle $b^6$, through which the liquid passing to it through the pipe $b^5$ is discharged in the form of a spray and distributed over the interior of the chamber, as shown.

Within the chamber B, which, with the tank or reservoir A, is or may be coated on its interior with a lining of insulating material $b^7$, and arranged directly beneath the nozzle $b^6$ is a group of electrodes C, through which a current of electricity may be applied to the liquid discharged through the nozzle $b^6$. These electrodes may be constructed in various forms; but as shown in the drawings they are made in part of triangular-shaped bars or tubes and in part of narrow thin plates. Of these the triangular-shaped bars or tubes are secured around the interior of the chamber B to the insulating-lining $b^7$ thereof in a circular row, while the remaining electrodes are disposed in concentric dentated circular rows within the same, with the angular projecting points of one row extending into the reëntrant angles of the other row, as shown. As thus disposed the rows of positive and negative electrodes are brought into alternation with one another, with the outer row $c$ composed of the positive elements, the next inner row $c'$ composed of negative elements, the next inner row $c$ composed of positive elements, and so on from the outer to the inner rows, in which relationship the positive rows are all electrically connected by appropriate conductors $c^2$, while the negative rows are similarly connected, through suitable conductors $c^3$, with both the positive and negative series, connected with the positive and negative poles of a dynamo D or other source of electric supply through appropriate conductors $c^4$ and $c^5$.

With the parts constructed and organized as above explained the liquid to be treated will pass from the source of supply through the inlet-pipe $b^5$ into the perforated nozzle $b^6$, whence it will be discharged in the form of a spray over and upon the upper ends of the electrodes D, where, passing downward between the positive and negative elements thereof, it will be subjected to the action of a current of electricity supplied from the dynamo D or other source of electric supply and thence flow downward through the aperture $b^4$, the nipple $a^4$, and coupling $a^5$, where it will enter the tank or reservoir A. In being thus subjected to the action of an electric current in passing between the electrodes C the metals or other substances contained in the liquid will be separated out therefrom and concentrated in the form of particles or masses of appreciable size and with the liquid as thus relieved will pass downward into the tank or reservoir A, where, by reason of their superior specific gravity, they will fall downward into the lower portion thereof, whence they may be recovered through the pipe $a'$ by opening the valve $a^2$ therein.

With the chamber B and its accessories are also employed the chambers E, which contain the filters F, through which the liquid contained in the tank or reservoir A passes on its way to the place of discharge. These chambers, like the chamber B, are each composed of a cylindrical body portion $e$, with conical heads $e'$ and $e^2$ respectively threaded upon its upper and lower ends. As thus constructed these chambers are or may be preferably coated on their respective interiors with an insulating-lining $e^3$ and are supported in an upright position on the tank or reservoir A through the intervention of nipples $e^4$, with which the tank or reservoir is provided, and appropriate couplings $e^5$ coöperating therewith. In some instances but a single one of these chambers may be employed. I prefer, however, to employ a plurality of such chambers and in the drawings have shown two, which are conveniently disposed on opposite sides of the chamber B. The filter F, with which each of these chambers is provided, is preferably composed of a cage or frame with a layer of felt or other appropriate filtering material applied to its exterior. This frame is preferably constructed with a cylindrical body portion $f$, which is somewhat less in diameter than the interior of the chamber and is formed from any suitable foraminated or reticulated material, with convex ends $f'$, which are or may be formed from imperforate material. As thus constructed this cage or frame is provided on its lower end with a downwardly-projecting threaded stem $f^2$, and, with an outlet-pipe $f^3$ extending upward through its upper end $f'$, it receives the filtering material $f^4$, which may be applied thereto. This filtering material, which is here shown as a layer of felt, is applied not only over the foraminated or reticulated portion $f$ of the cage or frame, but also over the imperforate ends $f'$ thereof, in which relationship it is firmly held by concave clamping members $f^5$, which are respectively held firmly clamped against the top and bottom convex ends $f'$ of the cage or frame by nuts $f^6$, $f^7$, and $f^8$, of which the nuts $f^6$ and $f^7$ engage with the outlet-pipe $f^3$ and the nut $f^8$ with the threaded stem $f^2$. With the filter F thus arranged, in each of the chambers E is employed means for cleaning its exterior and removing therefrom all masses of metal or other foreign substances that may have been deposited upon it by the liquid in passing inward through it. These cleaning means may be of various forms. As shown in the drawings, however, they consist of an annular brush or frame H, which surrounds each of the filters F and is provided on its interior with inwardly-extending scrapers or cleaning devices $h$—such, for instance, as groups of bristles or of wire. As thus constructed this brush or frame may be either dropped into its place in its respective chamber and centered and held therein in proper relationship to the filter by its gravity alone, or suitable retaining-clips $h'$, secured at one of their ends to the brush or frame and at their other to the conical head $e'$ by screws or rivets, may be employed for the purpose. With the cleaning devices arranged as thus explained the cleaning of each of the filter-surfaces is effected by imparting to the filter a vertical reciprocation up and down in contact with the scrapers $h$. This reciprocating movement may be imparted to the filters in various ways. I prefer, however, to avail of the outlet-pipe $f^3$ for the purpose, and to that end I extend this pipe upward through a suitable orifice $f^9$, formed in the conical head $e'$ of the chamber E, and provide the pipe with a suitable tappet $f'$,[10] which coöperates with an appropriate cam $i$, secured upon a shaft I, which in turn is rotatively mounted in suitable bearings $i'$ from the chamber E. As thus arranged a reciprocating movement may be imparted to each of the filters by simply rotating the shaft I from any suitable prime motor through the pulley $i^2$, with which the shaft is provided, and in order to insure of a tight joint being formed between the pipe $f^3$ and the orifice $e^6$ in the head $e'$ I provide the orifice with a suitable stuffing-box $e^7$. In some instances the bearings $i'$ may be secured to the conical upper end $e'$ of the chamber E by bolts or rivets. I prefer, however, to secure them thereto through the intervention of the glands $e^8$ of the stuffing-box $e^7$, and to that end I provide each of these bearings with a supporting-arm $i^3$, which is constructed with a laterally-extending portion $i^4$, that is provided with a suitable orifice $i^5$, which is adapted to pass over the male member of the stuffing-box $e^7$ and be clamped in place thereon by the glands $e^8$. With the parts arranged as thus described the upward and downward reciprocating movements of the filters may be effected in unison, or one may be raised at the same time that the other is lowered by arranging the cams $i$ in proper relationship to each other upon the shaft I. While thus the outlet-pipes $f^3$ are availed of for imparting vertical reciprocating movements to their respective filters F, their connection with the stationary discharge-pipe L may be effected in various ways. I prefer, however, to accomplish that result by extending each of these pipes $f^3$ laterally of the pipe L for some considerable distance and then either coiling or bending it back and forth upon itself a number of times, as shown at $l$. By this arrangement, as will be seen, the proper flexible action is allowed to the pipe to permit of its reciprocating action through the orifice $e^6$ and its connection with the stationarily-arranged discharge-pipe L.

The several parts being constructed and arranged as above described and a current of electricity supplied to the group of electrodes C, the operation of the apparatus is as follows: The liquid to be treated is delivered under pressure to the inlet-pipe $b^5$ from the source of supply and flowing along the same is discharged through an enlarged perforated nozzle $b^6$ in the chamber B over the electrodes C in the form of spray, whence it passes downward between the positive and negative elements of the latter and is discharged into the tank or reservoir A. In being thus passed between the electrodes C the liquid is subjected to the action of the electric current supplied to them, with the result that any metal or metals or other substances contained in it will be separated out and concentrated into particles or masses of appreciable size and in that form will, with the liquid, be discharged from the tank or reservoir A, where by reason of their superior gravity they will settle down to its bottom, whence they may be removed through the outlet-pipe $a'$ by opening the valve $a^2$ therein. While the metals or other substances thus separated out from the liquids settle down into the bottom of the tank or reservoir A the liquid from which they are separated rises in the chamber E, where it flows through the filters F and in so doing parts with any particles of metal or other substances that may be carried by it in mechanical suspension and entering the interior of such filters flows through the outlet-pipes $f^3$ to the discharge-pipe L, whence it is carried to the required point of discharge. While the liquid thus flowing upward through the discharge-pipe L from the tank or reservoir A is undergoing filtration the cleaning of the outer surfaces of the filters is being effected by their vertical reciprocating movements in contact with the scraping devices $h$ of the cleaning mechanism, and any particles of metal or other substances that may have been deposited upon these surfaces and adhering to them will be removed thereby and by their gravity will fall downward to the bottom of the chamber in which it is found and thence pass downward into the tank or reservoir A through the nipple $e^4$, where it will settle with the other particles or masses to the bottom thereof.

It will thus be seen that with the parts constructed and arranged as above explained an apparatus for separating out and concentrating metals or other substances from liquids and for purifying such liquids is produced, which in addition to being simple in construction and efficient in operation is practically automatic in its action.

While in the drawings I have shown the electric current as supplied from an ordinary dynamo, it is to be understood that this is merely illustrative and that any other source of electric supply may be employed and frictional, voltaic, or other forms of current made use of as required or found the most convenient. Again, while in the drawings I have shown and in the foregoing described the best means contemplated by me for carrying my invention into practice I do not limit myself strictly thereto, but reserve to myself the right to modify the same in various ways without departing from the spirit of my invention.

Having now described my invention, and specified certain of the ways in which it is or may be carried into effect, I claim and desire to secure by Letters Patent of the United States—

1. The combination, with a chamber having coöperating positive and negative electrodes arranged therein, an inlet through which the liquid to be treated is delivered to and distributed upon the electrodes, and means for supplying a current of electricity to these electrodes, of a settling tank or reservoir provided with an overflow, a filter connected with this overflow and adapted to relieve the purified liquids of the precipitants, and means for returning these products to the settling tank or reservoir, substantially as described.

2. The combination, with a chamber adapted to receive liquids to be treated, coöperating positive and negative electrodes arranged therein, and means for energizing these electrodes, of a tank or reservoir into which the products of the liquids are discharged from this chamber, filtering devices connected with the said tank or reservoir, and means for relieving the filter of any substances that may be deposited upon it and causing their return to the tank or reservoir, substantially as described.

3. The combination, with a tank or reservoir for receiving the precipitants of electrically-purified liquids, having means through which these precipitants may be removed therefrom, of an inlet through which the liquid after having been electrically treated is delivered to such tank or reservoir, overflows to carry off the purified liquids, a chamber containing electrically-treating means connected with said inlet, filters connected with the overflows of the tank or reservoir, and means for removing from the filters any precipitants that may be deposited upon their surfaces and causing them to return to the tank or reservoir, substantially as described.

4. The combination, with a tank or reservoir for receiving the precipitants of electrically-purified liquids having means through which the removal of these precipitants therefrom may be effected, a chamber connected with the tank or reservoir and containing coöperating positive and negative electrodes, means for energizing these electrodes, means through which the liquid to be treated is delivered to such chamber and diffused over the electrodes, overflows on the tank or reservoir, filtering-chambers connected with the overflows, moving filters within the chambers, means for moving the filters and cleaning them while being thus moved, substantially as described.

5. The combination, with an apparatus for purifying liquids having a settling tank or reservoir which is provided with an inlet, and with overflows, of a chamber containing coöperating positive and negative electrodes, means for energizing these electrodes and for supplying liquid to and diffusing it in such chamber over the electrodes, filtering-chambers connected with the overflows of the tank or reservoir, stationary brushes within these last-mentioned chambers, movable filters subject to the action of such brushes, means for moving these filters, a common discharge from said filters, and flexible connections between such discharge and the moving filter, substantially as described.

6. The combination, with an apparatus for purifying liquids having a settling tank or reservoir, of a chamber containing coöperating positive and negative electrodes in which the liquids are subjected to the action of an electric current, means for exciting such electrodes, connecting means between the tank or reservoir and the chamber, overflows for the tank or reservoir, filtering-chambers connected with these overflows, brushes within these filter-chambers, filters adapted to move against these brushes, flexible outlets to the filters, projections extending from the outlets, cams and a supporting-shaft coöperating with these projections whereby to reciprocate the filters, brackets secured to the filter-chambers and supporting the cam-shaft, stuffing-boxes for the outlets, and means for actuating the shaft and cams, substantially as described.

7. The combination with a tank or reservoir, a non-conductive chamber provided with conical ends, coöperating positive and negative electrodes arranged in such chamber, and means through which a current of electricity may be supplied to these electrodes, of means through which the liquid to be treated is subjected to the influence of an electric current between such electrodes, and outlet means connected with such tank or reservoir, of non-conductive filtering-chambers connected with the tank or reservoir and having conical ends, outlet-pipes extending through the upper ends of the filtering-chambers and carrying filters at their lower ends, means for actuating the outlet-pipes whereby to impart to the filters a vertical reciprocation, and cleaning devices to scrape the outer surfaces of the filters as these filters are moved up and down with relation to them, substantially as described.

8. The combination with a tank or reservoir, electrode and filtering chambers having insulated interiors, conical ends, with inlet and outlet means in the heads, carried by this tank or reservoir and connected with its interior, couplings adapted to connect the lower ends of these various chambers with the tank or reservoir, filters arranged within the filtering-chambers, and having outlet-pipes capable of movement through the upper ends of said filtering-chambers, a common discharge-pipe, and resilient connections between this discharge-pipe and the outlet-pipes of the filters, substantially as described.

In witness whereof I have hereunto set my hand this 23d day of April, 1904.

LÉON DION.

Witnesses:
WILLIAM C. ALLAN,
CHAS. E. POENSGEN.